US006885473B2

(12) United States Patent
Tsuruya

(10) Patent No.: US 6,885,473 B2
(45) Date of Patent: Apr. 26, 2005

(54) IMAGE FORMING APPARATUS HAVING CLEANER DEVICES FOR PERFORMING IMPROVED CLEANING OPERATIONS

(75) Inventor: Satoshi Tsuruya, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 900 days.

(21) Appl. No.: 09/842,679

(22) Filed: Apr. 27, 2001

(65) Prior Publication Data

US 2002/0051143 A1 May 2, 2002

(30) Foreign Application Priority Data

May 1, 2000 (JP) ....................................... 2000-132430

(51) Int. Cl.[7] ............................ G06F 3/12; G06F 13/00

(52) U.S. Cl. ....................... 358/1.18; 358/1.8; 399/123; 399/34

(58) Field of Search ................................ 358/1.18, 1.8, 358/1.7; 399/34, 35, 71, 120, 122, 123, 343

(56) References Cited

U.S. PATENT DOCUMENTS 5,966,567 A * 10/1999 Matsuzaki et al. .......... 399/111
6,404,996 B1 * 6/2002 Mori et al. ................... 399/24

* cited by examiner

*Primary Examiner*—Douglas Tran
(74) *Attorney, Agent, or Firm*—Fitzpatrick, Cella, Harper & Scinto

(57) ABSTRACT

The present invention is to provide an image forming apparatus in which each of the plurality of image forming station includes an image bearing body, a developer for developing latent image on the image bearing body by toner, and a cleaner for effecting cleaning of toner on the image bearing body. The toner image on the image bearing body is transferred to a carrying member side; toner on the carrying member is collected by the cleaner via the image bearing body. A volume of the cleaner of first image forming station of the plurality of image forming station to contain toner made is larger than a volume of cleaners of other image forming stations to contain toner.

11 Claims, 10 Drawing Sheets

IMAGE FORMING APPARATUS HAVING CLEANER DEVICES FOR PERFORMING IMPROVED CLEANING OPERATIONS

BACKGROUND OF THE INVENTION

1. Field of the Invention

The present invention relates to an image forming apparatus, such as a laser printer, a copying machine, a facsimile equipment, which use electrophotographic recording method. More particularly, the invention relates to the in-line type image forming apparatus for forming color image with a plurality of image bearing bodies by superposing the image formed on each image bearing body one after another on one and the same recording material.

2. Related Background Art

There have been proposed various image forming apparatuses that utilize electrophotographic recording method for the formation of color image on a recording material. Some of them have already been in practical use.

The image forming apparatus of electrophotographic recording method has an advantage in that it can make its recording speed faster than those using other recording methods, such as the ink jet method that forms images by spraying ink droplets directly to a recording sheet or the silver photographic method that records images by exposing them on a photosensitive coloring material. With this advantage, the image forming apparatus of the kind is designed to be different from those using other methods in order to meet the need on the market for higher speed recording.

As the typical example of color image forming apparatus utilizing electrophotographic recording method, there is the one in which a rotational developing apparatus is incorporated, for example. This rotational developing apparatus is provided with four developing devices containing four color developers (toners) of yellow, magenta, cyan, and black, along the periphery of the rotational body, and structured to be able to develop image one after another by use of each toner on the photosensitive body which serves as an image bearing body.

The image forming apparatus that adopts this rotational developing apparatus develops the electrostatic latent image of each color, which is formed on the photosensitive body, by means of the developing device of color corresponding to the developing position that faces the photosensitive body, thus making the electrostatic latent image visible as the toner image, and then, each time when the toner image is obtained on the photosensitive body, such toner image is transferred onto a sheet type recording material, such as recording sheet. This process is repeated to superpose each toner image of different color on the recording sheet for the formation of a color image.

As another example of the image forming apparatus that uses the rotational developing apparatus, there is devised the one which obtains color image on a recording sheet in such a manner that an electrostatic latent image is formed on a photosensitive body, and such image is developed repeatedly by use of the developing devices of corresponding colors so as to form on the photosensitive body the toner image having plural colors by superposing toner image of each color, and that the toner image having plural colors thus superposed is transferred onto a recording sheet altogether.

On the other hand, there is the so-called in-line type image forming apparatus in which a plurality of photosensitive bodies are provided, and each electrostatic latent image on each photosensitive body is developed by use of each developing device so as to from toner image of each color on each photosensitive body separately, and then, the toner image of each color is transferred to and superposed on the recording sheet which is carried to the plural photosensitive bodies sequentially, thus obtaining an color image on the recording sheet.

Here, there is also an in-line type image forming apparatus that adopts intermediate transfer, in which the toner image of each color is not transferred to a recording sheet directly, but transferred from each photosensitive body to and superposed once on an intermediate transfer body, and after that, transferred to a recording sheet together in order to provide a color image for the recording sheet.

These color image forming apparatuses of electrophotographic recording method have advantages, and some of disadvantages as well, but from the viewpoint of meeting the need on the market for higher speed recording in recent years, those of in-line type are regarded as superior, and there are many products of this type which have already been in use practically.

FIG. 9 is a side view which shows one structural example of the color image forming apparatus that adopts in-line method, and represents schematically the principal inner structure thereof. This image forming apparatus is structured in an in-line color printer of four-drum multiple transfer type.

This in-line color printer is provided with an endless transfer belt 6 which serves as a recording material carrying member. The transfer belt 6 is tensioned on a driving roller 7, a driven roller 9, and a tension roller 10, and driven to rotate in the direction indicated by an arrow A. Along the transfer belt 6, four photosensitive drums (drum type electro-photographic sensitive bodies) 1*a*, 1*b*, 1*c*, and 1*d*, which serve as image bearing bodies are arranged in series, and with the photosensitive drums 1*a*, 1*b*, 1*c*, and 1*d*, and other image forming means, image forming stations PY, PM, PC and PK are structured to form each of toner images of yellow, magenta, cyan, and black, respectively.

Generally, it is important for an in-line apparatus of the kind to make color deviations (color registration displacements) smaller among superposed images of plural colors in order to obtain a color image in high quality. Therefore, the interval between adjacent image forming stations PY to PK themselves, that is, the interval between the adjacent photosensitive drums 1*a* to 1*d* themselves, should be made equal. Thus, highly precise arrangements are required for the photosensitive drums (1*a* to 1*d*). Also, in order to make it difficult to allow color deviations to occur, there is a need for establishing designated relations between each interval of photosensitive drums (1*a* to 1*d*), and each outer diameter of photosensitive drums (1*a* to 1*d*), and the outer diameter of driving roller 7, respectively, and also, there is a need for rotating each of the photosensitive drums (1*a* to 1*d*) at an equal angular speed, among some others.

Each image forming means of the image forming stations PY, PM, PC, and PK comprises photosensitive drums 1*a*, 1*b*, 1*c*, and 1*d*; chargers (charging rollers) 2*a*, 2*b*, 2*c*, and 2*d*, arranged around them; exposing apparatuses 3*a*, 3*b*, 3*c*, and 3*d*; developing devices 4*a*, 4*b*, 4*c*, and 4*d*; and drum cleaners 15*a*, 15*b*, 15*c*, and 15*d*. Image forming means of each color is structured substantially the same with the exception of the developing devices 4*a*, 4*b*, 4*c*, and 4*d* each of which contains yellow, magenta, cyan, and black toner, respectively.

To describe the image forming operation in four full colors, each of the photosensitive drums (1$a$ to 1$d$) is rotated at first so that each surface thereof is charged uniformly by the charging rollers (2$a$ to 2$d$), respectively. Then, the laser beams modulated in accordance with image data are irradiated from each of the exposing apparatuses (3$a$ to 3$d$) to form desired electrostatic latent image on the surface of each photosensitive drum (1$a$ to 1$d$) corresponding to each color. The latent image on each of the photosensitive drums (1$a$ to 1$d$) is reversely developed on the developing position by each of the developing devices (4$a$ to 4$d$) by use of toner, thus being visualized as toner image each using yellow, magenta, cyan, and black toner.

The toner image of each color formed on each of the photosensitive drums (1$a$ to 1$d$) is transferred electrostatically to and superposed one after another on the recording sheet P, which is carried on the transfer belt 6 for conveyance, by use of each of the transfer rollers (8$a$ to 8$d$) of transfer means at each of the transfer nipping portions to face each of the photosensitive drums (1$a$ to 1$d$), respectively. The recording sheet P is supplied from sheet feeding means (not shown) onto the transfer belt 6 by way of carrying means and borne on the transfer belt 6.

The four-color toner image multiply transferred onto the recording sheet P in such a manner is carried to a fixing device (not shown) where toner of each color is fused to mix colors and fixed. Thus, a desired printed image is obtained on the recording sheet P in colors.

When a monochromatic image in black is formed, image forming means PY to PC, other than the one for black, are not driven, and the photosensitive drums 1$a$ to 1$c$ and the transfer belt 6 are allowed to part from each other by use of a mechanism (not shown). In this condition, the same image forming operation is executed with respect to the photosensitive drum 1$d$ of black image forming means PK.

The residual toner each on the photosensitive drums (1$a$ to 1$d$) after transfer is removed by each of the drum cleaners (15$a$ to 15$d$) provided with a cleaning blade and others so as to be prepared for the next image forming process.

In this respect, although there have been proposed various developing methods conventionally, it may be possible to apply developing devices (4$a$ to 4$d$) of contact method or those of non-contact method to the image forming apparatus shown in FIG. 9. Also, with respect to the toner that serves as developer, it is possible to apply the one-component toner which can be used as toner individually or use the two-component toner which is used by mixing it with magnetic carrier, irrespective of types thereof. Here, as one example, a contact developing method that uses non-magnetic one-component toner may be cited.

In the image forming apparatus shown in FIG. 9, the photosensitive drums (1$a$ to 1$d$), the chargers (2$a$ to 2$d$), the developing devices (4$a$ to 4$d$), and the cleaners (15$a$ to 15$d$), among each image forming means of the image forming stations Pa to Pd, are integrally formed as each of process cartridges (113$a$ to 113$d$) as shown in FIG. 10, and then, structured to be detachably attachable to the main body of image forming apparatus.

This image formation apparatus is provided with means for detecting the toner reminders in the aforesaid process cartridges (113$a$ to 113$d$) and notifying the user thereof accordingly. Then, when a toner of certain color in a cartridge is consumed and the life thereof has been reached, the user is required to replace that particular cartridge only. Then, the user can use the apparatus continuously without any maintenance that should be carried out by a service engineer as in the case of a copying machine or the like.

With such a cartridge mode as described above, it becomes possible to obtain images in good condition stably at all times without drawback during the life thereof. There is also an advantage that the user can replace cartridges with ease when the life span thereof is reached. Also, as compared with the case where no cartridge mode is adopted, there is no need for replacing the photosensitive drum, the charger, the developing device, or the toner container or the like, which constitutes image forming means, each individually, thus suppressing the frequency of maintenance to a considerable extent.

Meanwhile, among color image forming apparatuses, there is the one that performs the so-called density control, that is, to optimize control by detecting patch densities, in order to uniformalize the densities of output images by modifying the control value of the developing bias, charging bias, or the like in several steps at a designated timing for the formation of designated patches which serve as toner images for detection use.

In the apparatus shown in FIG. 9, patches are formed on each photosensitive drum and transferred to the transfer belt 6. In this way, patches are formed on the transfer belt 6. Then, with reflection density detecting means (not shown), the patch densities are detected so as to execute the density control.

With the aforesaid patch formation, jamming of recording sheet, or the like, toner may adhere to the transfer belt 6 that serves as carrying passage. The adhesion of such toner is removed by the belt cleaner 11, which is provided with a cleaning blade or the like, arranged for the transfer belt 6 at a designated timing.

The toner thus removed from the transfer belt 6 and collected into the interior of cleaner 11 may be contained in a waste toner box detachable arranged for the cleaner 11 by way of a carrying screw or the like (not shown).

However, when the toner adhering to the transfer belt 6 should be collected by use of the belt cleaner 11 as in the case of the image forming apparatus shown in FIG. 9, the user is required to replace the cleaner 11 or the aforesaid waste toner box periodically. Thus, it becomes troublesome in terms of maintenance. Also, a space is needed for the arrangement of these devices to create a problem that the apparatus becomes larger eventually.

Further, it becomes necessary to provide a sensor for detecting the incapability of the cleaner 11 or the waste toner box to contain toner any longer, and means for notifying the user thereof accordingly or the like as well. As a result, a problem is also encountered that the costs of apparatus are made higher inevitably.

As a way to solve these problems, it is conceivable to adopt a mode in which the cleaners of the transfer belt 6 are eliminated as in the in-line color printer shown in FIG. 11, and the toner that adheres to the transfer belt 6 is returned to each photosensitive dram and collected by use of the drum cleaner thereof.

For the in-line color printer shown in FIG. 11, the belt cleaner is not arranged for the transfer belt 6 tensioned around two rollers, a driving roller 7 and a driven roller 9 as described above. The waste toner box is not arranged, either. Therefore, the apparatus itself can be made smaller, and also, waste toner detecting means or the like can be eliminated, thus implementing the cost down accordingly.

With the formation of patches described above, the jamming of recording sheet, or the like, toner is caused to adhere to the transfer belt 6. However, such toner is collected from each of the photosensitive drums to the respective drum cleaners subsequent to having been electrostatically returned to each of the transfer rollers that face to be in contact with the photosensitive drums via the transfer belt 6 utilizing the potential difference with the photosensitive drums by applying designated positive and negative cleaning biases at a designated timing of no image formation, that is, the timing at which toner on the transfer belt 6 (patch image, for instance) is cleaned beginning with the yellow station.

Nevertheless, when each amount of collected toners is examined, it is found that there is a considerable difference depending on the cleaners 15*a* to 15*d*. For this example, the collected toner is concentrated on the cleaner 15*a* at the yellow station PY, that is, the first color image forming station where cleaning is executed at first. As a result, depending on the condition in which the user uses the image forming apparatus, the capacity of cleaner 15*a* becomes insufficient so that the collected toner overflows from the cleaner. Thus, there may be encountered a problem that the waste toner is subjected to the so-called condition of puncture. As a result, it becomes necessary to perform a partial maintenance of cartridge, which deteriorates the maintainability of the apparatus as a whole.

Particularly for the user who outputs mainly the low-level print images having a smaller amount of prints, the process cartridges 113*a* to 113*d* are used for a long time without replacing any one of them. There is encountered a condition that the cleaner 15*a* is punctured by waste toner eventually despite toner still remains unused sufficiently in the developing device 4*a* of the cartridge 113*a*.

Therefore, before the user is notified of the cartridge having reached the life span, the process cartridge 113*a* becomes unusable, and toner remaining in the developing device 4*a* is discarded wastefully. Also, if waste toner spreads inside the apparatus due to the toner puncture of cleaner 15*a*, critical damage is given to the apparatus eventually.

Meanwhile, with respect to the electrophotographic type color image forming apparatus, market researches are conducted as to the user behavior of actual use thereof. As a result, it has been confirmed that the consumption of black toner is great in terms of the total quantity of toners used, although there are the pictorial full color images like photographs, the one-point business color images which are partially colored only on the portion where emphasis is needed, and monochromatic images, among some others.

Therefore, as shown in FIG. 10, if the process cartridges 113*a* to 113*d* are structured in the same way, and the amount of toner content of each color is all the same for the developing devices 4*a* to 4*d*, toner puncture tends to occur by the cleaner 15*d* of the black cartridge 113*d*. As a result, the replacement frequency becomes more for the cartridge 113*d* so as to inevitably deteriorate the maintainability of the apparatus.

SUMMARY OF THE INVENTION

It is an object of the present invention to provide an image forming apparatus capable of preventing the maintainability thereof from being deteriorated due to only a partial puncture of plural cleaning means provided therefor.

It is another object of the invention to provide an image forming apparatus which comprises a carrying member for bearing toner image; and a plurality of image forming means arranged along the carrying member, in which each of the plurality of image forming means includes an image bearing body, developing means for developing latent image on the image bearing body by toner, and cleaning means for cleaning toner on the image bearing body. In this image forming apparatus, toner image on the image bearing body is transferred to the carrying member side; toner on the carrying member is collected by the cleaning means via the image bearing body; and the volume of cleaning means of first image forming means of the plurality of image forming means to contain toner made is larger than the volume of cleaning means of other image forming means to contain toner.

Other objectives and advantages besides those discussed above will be apparent from the description of a preferred embodiment of the invention which follows.

DETAILED DESCRIPTION OF THE PREFERRED EMBODIMENTS

Hereinafter, in conjunction with the accompanying drawings, the embodiments will be described further in detail in accordance with the present invention.

(First Embodiment)

Figure 1:
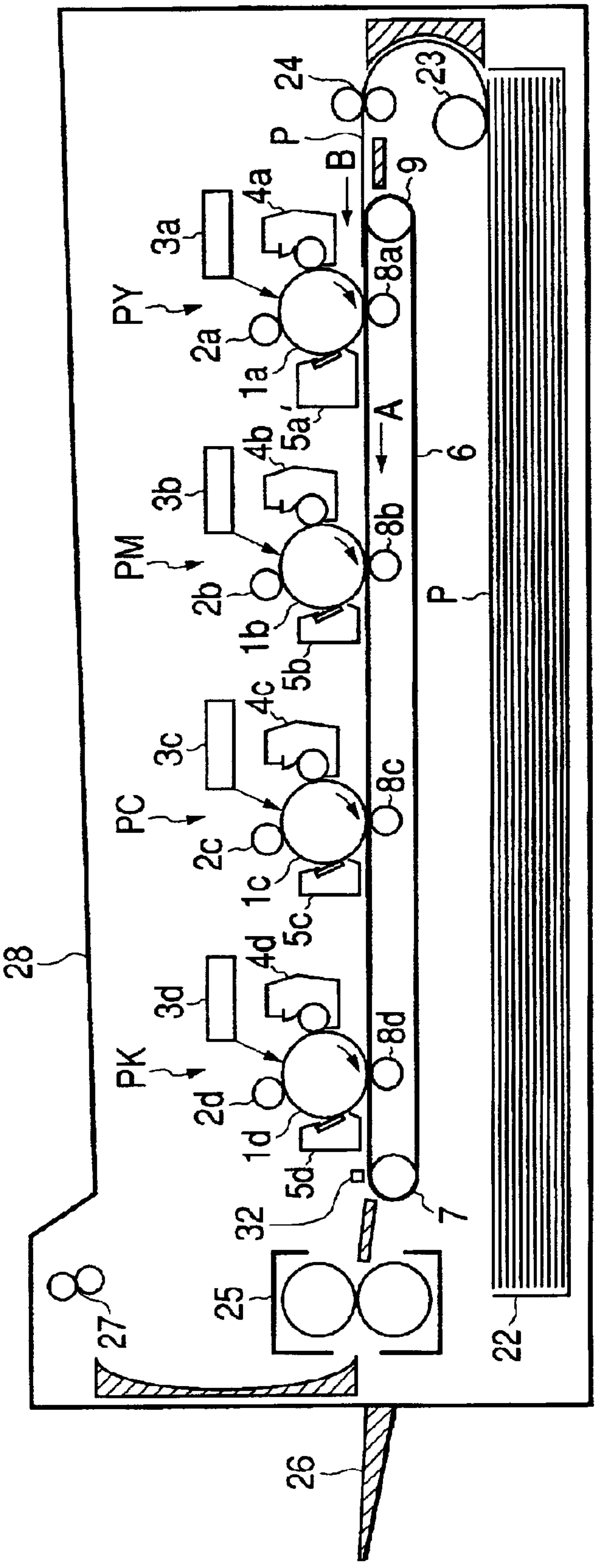
FIG. 1 is a view which shows an image forming apparatus in accordance with one embodiment of the present invention.

FIG. 1 is a view which shows the structure of an image forming apparatus in accordance with one embodiment of the present invention. This image forming apparatus is an ink-line type color printer provided with four image forming stations PY to PK arranged in series along the transfer belt 6 which services as a recording material carrying member.

This embodiment is characterized in that the drum cleaner 5*a*' of the first image forming station, which is the yellow station PY of the first image forming means in accordance with the present embodiment, has a larger toner capacity than each of the cleaners 5*b* of the second magenta, 5*c* of the third cyan, and 5*d* of the fourth black stations PM to PK, respectively. In this respect, the cleaners (5a' to 5d) are positioned on the downstream side of the photosensitive drums (1a to 1d) in the recording material carrying direction of the transfer belt 6, respectively, and the developing devices (4a to 4d) are positioned on the upstream side thereof.

Figure 2:
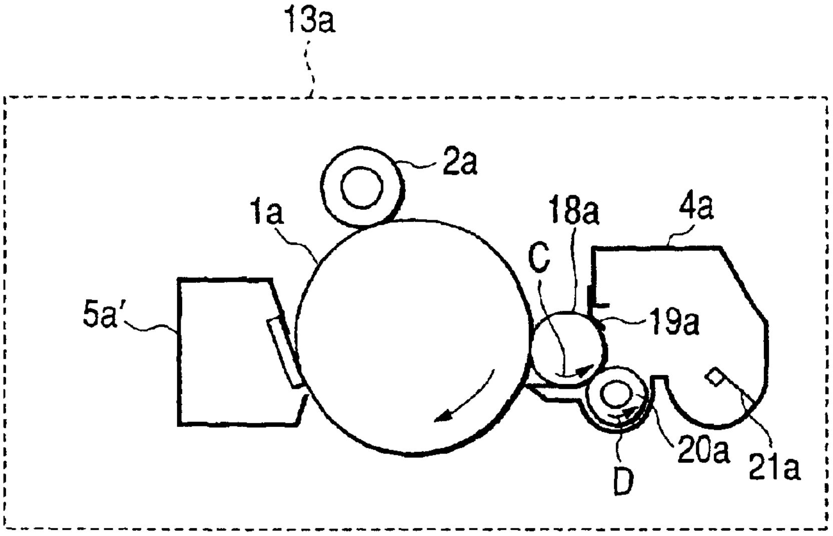
FIG. 2 is a view which shows the first station process cartridge of the image forming apparatus represented in FIG. 1.
Figure 3:
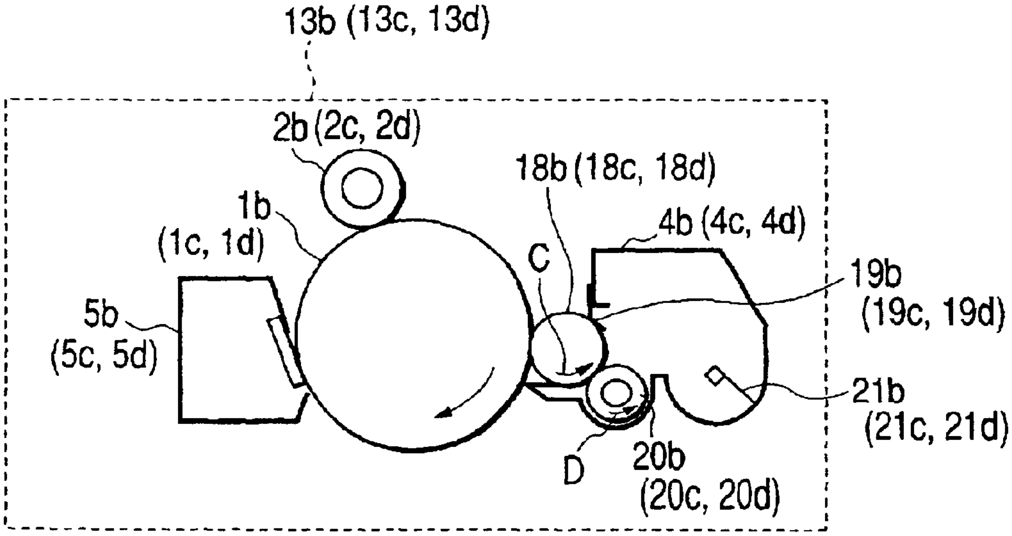
FIG. 3 is a view which shows the second to fourth station process cartridge of the image forming apparatus represented in FIG. 1.

Of the image forming means of first station PY, the photosensitive drum 1a, the charger 2a, the developing device 4a, and the drum cleaner 5' are integrally incorporated as shown in FIG. 2, and structured to be the process cartridge 13a which is detachably attachable to the main body of image forming apparatus. Likewise, as shown in FIG. 3, for the image forming means of second, third, and fourth stations PM, PC, and PK, the photosensitive drums 1b, 1c, and 1d, the chargers 2b, 2c, and 2d, the developing devices 4b, 4c, and 4d, and the drum cleaners 5b, 5c, and 5d are structured as the process cartridges 13b, 13c, and 13d, respectively, each of which is detachably attachable to the main body of image forming apparatus.

The developing devices 4a to 4d of the respective cartridges 13a to 13d are structured in the same manner with the exception of colors of developers (toner) contained therein. Therefore, in order to simplify the description, the developing device 4a of yellow cartridge 13a will be described as given below.

The developing device 4a is a contact developing apparatus that uses one-component non-magnetic toner, and comprises a developing portion and a developer container, which are integrally formed inside the cartridge 13a.

The developing portion of developing device 4a is provided with the developing sleeve 18a which rotates in the direction indicated by an arrow C. The one-component non-magnetic toner is carried on the developing sleeve 18a. Toner is regulated by a blade 19a to make the layer thickness of toner small, and at the same time, to provide a charge (triboelectricity) having negative polarity for toner by means of friction charging. Toner on the developing sleeve 18a is carried along with the rotation of the developing sleeve 18a to the developing portion that faces the photosensitive drum (drum type electrophotographic sensitive body) 1a which is the image bearing body. Then, by means of developing bias applied to the developing sleeve 1a, toner is allowed to adhere to the electrostatic latent image formed on the photo-sensitive drum 1a and develop the latent image so as to visualize it as the toner image.

Toner is carried from the developer container side to the developing portion side, and the toner thus carried is supplied to the developing sleeve 18a by use of an RS roller 20a. Then, as described above, toner is carried on the developing sleeve 18a. The RS roller 20a abuts against the developing sleeve 18a and rotates counterclockwise in the direction indicated by an arrow D that moves in the reverse direction at the abutting portion. This RS roller 20a functions to strip off the remaining toner on the developing sleeve 18a after development in order to prevent toner from being deteriorated by residing on the developing sleeve 18a.

In the developer container, one-component non-magnetic toner is contained, and a toner carrying member 21a is arranged therefor to supply toner to the development side. The toner carrying member 21a rotates to supply toner to the developing portion side, and at the same time, agitates the toner stripped off by the RS roller 20a and toner in the container, thus functioning to prevent the deterioration of toner.

In this respect, each of the process cartridges 13a to 13d is provided with detection means (not shown) in the developer container for detecting toner remainders therein. With the known optical detection method or electrostatic capacitance detection method, the detection means is installed, and when the toner remainders become small, it is arranged to notify the user of the replacement of cartridges and prompt the user accordingly at the designated timing.

With this notification that prompts replacements, the user is given a time for preparing process cartridges, and when a process cartridge reaches the life span thereof, the use replaces only such cartridge for the continuous use of the apparatus. Also, each of the process cartridges is designed to provide the optimal span of life, respectively, to make it possible to obtain images in good condition stably at all times without drawback until the life span of the cartridge is reached.

Now, hereunder, the detailed description will be made of the image forming operation of this image forming apparatus.

With the rotation of each of the photosensitive drums (1a to 1d), the surface thereof is negatively charged uniformly by use of each of the charging rollers (2a to 2d). Then, each of the exposing apparatuses (3a to 3d) irradiates modulated laser beams in accordance with the image data transmitted from a host, such as a personal computer, to form a desired electrostatic latent image on each surface of the photosensitive drums (1a to 1d) corresponding to each color. The latent image on each of the photosensitive drums (1a to 1d) is reversely developed on the developing position by each of the developing devices (4a to 4d) using negatively charged toner. Then, it is visualized as yellow, magenta, cyan, and black toner image, respectively.

With the image forming operation described above, the yellow toner image is formed at first on the photo-sensitive drum 1a at the first image forming station PY. During this period, a recording sheet P is supplied by use of a sheet feeding roller 23 from the recording material container 22, such as a cassette, and carried to registration roller pair 24. The recording sheet P stops at the registration roller pair 24 once, and then, supplied to the transfer belt 6 at a designated timing and carried thereon. Thus, along with the rotation of transfer belt 6, the recording sheet is carried to the transfer portion which faces the photosensitive drum 1a. Then, the yellow toner image on the photosensitive drum 1a is electrostatically transferred to the recording sheet P by the transfer roller (transfer charger) 8a which is arranged to be in contact inside the belt 6 of the transfer portion.

In continuation, the same process is carried out each at the second, third, and fourth color image forming stations PM, PC, and PK. Then, the magenta, cyan, and black toner images are formed, respectively, on the photosensitive drums 1b, 1c, and 1d, and transferred to the recording sheet P one after another, hence obtaining on the recording sheet P the color image which is formed by four-color toner images multiply transferred thereon. In other words, the transfer belt bears and carries toner images via the recording material.

The recording sheet P having the toner images multiply transferred thereon is carried to a fixing device 25 where toners of each color are fused to be mixed and fixed. In this way, a desired color print image is obtained on the recording sheet P. After fixation, the recording sheet P is discharged with the face thereof upward to a sheet discharging tray 26 arranged on the side of the apparatus from the apparatus sheet discharging portion on the downstream of the fixing device 25. If a recording sheet P should be output with the face thereof downward, the recording sheet is discharged from the fixing device 25 to a sheet discharging tray 28, which is arranged on the upper face of the apparatus, by use of a discharging roller pair 27 via a designated ascending passage.

The toners which remain on the photosensitive drums 1_a_ to 1_d_ are removed by use of the cleaners 5_a_' and 5_b_ to 5_d_ each provided with a cleaning blade and others so as to prepared them for the next image forming process.

For this image forming apparatus, control values, such as developing bias, charging bias, are modified at several steps in order to form designated patches, that is, the images for detection use which are used for detecting the densities of toner images, on the transfer belt 6 at a designated timing, thus executing the density control by detecting the patch densities so as to implement the optimal control. In other words, patched latent images are formed on the photosensitive drums, and developed by use of developing devices to form patches on the photosensitive drums, respectively. Then, the patches thus obtained are transferred to the transfer belt 6 to form the patched images on the transfer belt 6. Each density of such patched images is detected by reflection density detecting means 32, and based upon such detection, the density control is executed.

In order to optimize the density of output image, or to match the color tones between output images, the density control is executed at the time of non-image formation. For the present embodiment, the density control is executed when the main switch of image forming apparatus is turned on; when printing is completed on a designated number of sheets; when any one of process cartridges is replaced; or when density control is requested by the user or the like, which is considered to be a timing at non-image formation. It is also possible to utilize each of the patches for use of image detection in order to detect the position of toner image.

The toner that adheres to the transfer belt 6 when forming the aforesaid patches is electrostatically returned to the photosensitive drams 1_a_ to 1_d_ by means of potential difference with the application of a designated cleaning bias to each of the transfer rollers 8_a_ to 8_d_ which face to be in contact with the photosensitive drums (1_a_ to 1_d_) via the transfer belt 6 at a designated timing, that is, the timing at which the cleaning of toner on the transfer belt (a patch image, for instance) is allowed to begin with the yellow image forming station. In accordance with the present embodiment, the bias which is applied to the transfer rollers 8_a_ to 8_d_ is arranged to be positive and negative alternately. For example, the bias which is applied to the transfer rollers 8_a_ and 8_c_ has negative polarity, while the one to the transfer rollers 8_b_ and 8_d_, positive polarity.

When the transfer belt 6 is cleaned, the cleaning efficiency can be enhanced by intensifying the friction force between the transfer belt 6 and the photosensitive drums 1_a_ to 1_d_. The control may be made in such a manner that the peripheral speed of the transfer belt is made almost the same as that of the photosensitive drums when an image is formed, but the peripheral speed of the transfer belt can be made 1.5 times that of the latter when cleaning is executed, for example.

The toner which has been returned to the photosensitive drums 1_a_ to 1_d_ is collected in each of the drum cleaners 5_a_', and 5_b_ to 5_d_. Thus, the photosensitive drums 1_a_ to 1_d_ from which toner has been collected each are on standby for image forming process.

With the examination of the amount of toner collected from the transfer belt 6 to each of the cleaners 5_a_' and 5_b_ to 5_d_, it has been found that the cleaner 5_a_' contains approximately 70% of the total amount of collected toner, and that the cleaner 5_b_ contains 20% and the cleaner 5_c_ contains most of the remaining 10%. Almost no toner is collected to the cleaner 5_d_. In other words, the toner collection concentrates on the first image forming station PY.

Also, it is anticipated that toner adheres to the transfer belt 6 when a recording sheet is jammed, and cleaning is then executed. In this case, the amount of toner collected to each of the cleaners 5_a_' and 5_b_ to 5_d_ differs depending on the location where sheet jamming takes place or the way whereby to remove the jammed recording sheet. However, on the assumption of the jamming ratio of the image forming apparatus of the present embodiment, such amount should be almost negligible as compared with the amount of toner to be collected per density control as described above. It is not considered that there is any great influence on the collection ratio between each of the cleaners 5_a_' and 5_b_ to 5_d_.

Now, as shown in FIG. 1, the capacity of the cleaner 5_a_' that can contain waste toner for the first yellow image forming station PY is made larger than each of the capacities of cleaners 5_b_ to 5_d_ that contain waste toner for the first to fourth image forming stations PM to PK, respectively.

Usually, the capacity of a cleaner to contain waste toner for a process cartridge is designed on the basis of numerical value worked out by multiplying a specific ratio (collection ratio) having the worst transfer efficiency or the like added thereto, and the amount of toner filled in a developing device. However, for the cleaner 5_a_' of the present embodiment, the amount of toner collected per density control is worked out in addition to the usual amount thus calculated, and the capacity of the cleaner 5_a_' to contain waste toner is set at a value approximately 1.4 times those of the other cleaners 5_b_ to 5_d_. More specifically, the calculation is made in consideration of the execution frequency of density controls estimated during the life span of cartridge with the life span of the process cartridge and the target number of print sheets per month in view.

As described above, with the capacity of yellow cleaner 5_a_' being set at a larger value, it becomes possible to avoid the so-called condition of waste toner puncture where waste toner overflows from the cleaner 5_a_'. Then, with the avoidance of puncture condition, there is no possibility that the user is notified of the cartridge life whereas toner still remains sufficiently in the developing device 4_a_. The process cartridge is thus prevented from becoming unusable, and the toner that still remains in the developing device is not discarded wastefully, either. Also, it becomes possible to prevent any critical damage from being caused to the apparatus due to spreading of waste toner inside the image forming apparatus by the puncture of the cleaner 5_a_'. For the user that prints at a low printing rate, in particular, the replacement frequency of the yellow cartridge 13_a_ can be reduced to make it possible to implement enhancing the user's maintenance.

For the present embodiment, the capacity of the yellow cleaner 5_a_' is set at a large value which is 1.4 times those of the other three color cleansers 5_b_ to 5_d_. However, since the amount of toner collected to the magenta cleaner 5_b_ is the second largest due to the electric field of transfer roller 8_b_, it may be possible to set the capacity of the magenta cleaner 5_b_ at a value 1.1 times those of the remaining two color cleaners 5_c_ and 5_d_.

Figure 9:
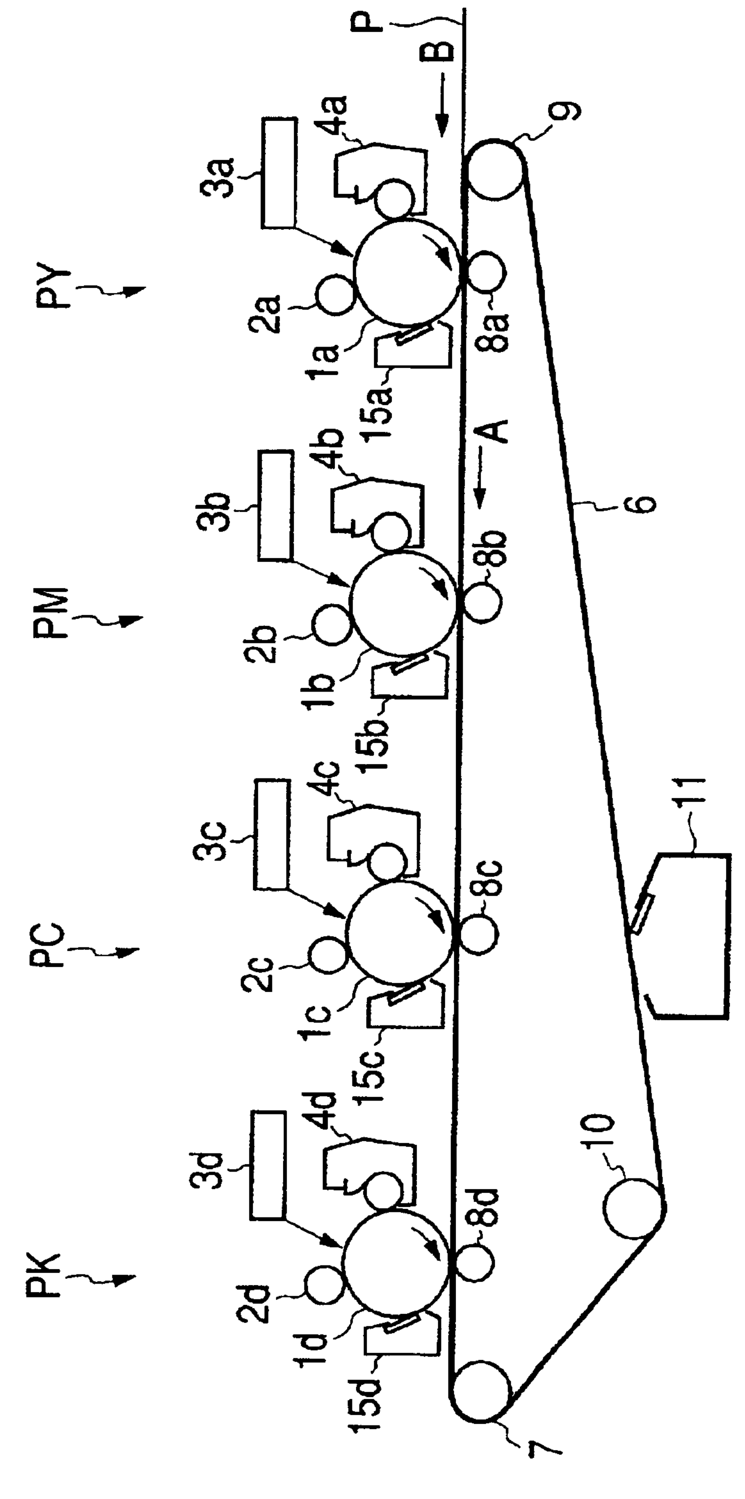
FIG. 9 is a view which shows the conventional image forming apparatus.
Figure 10:
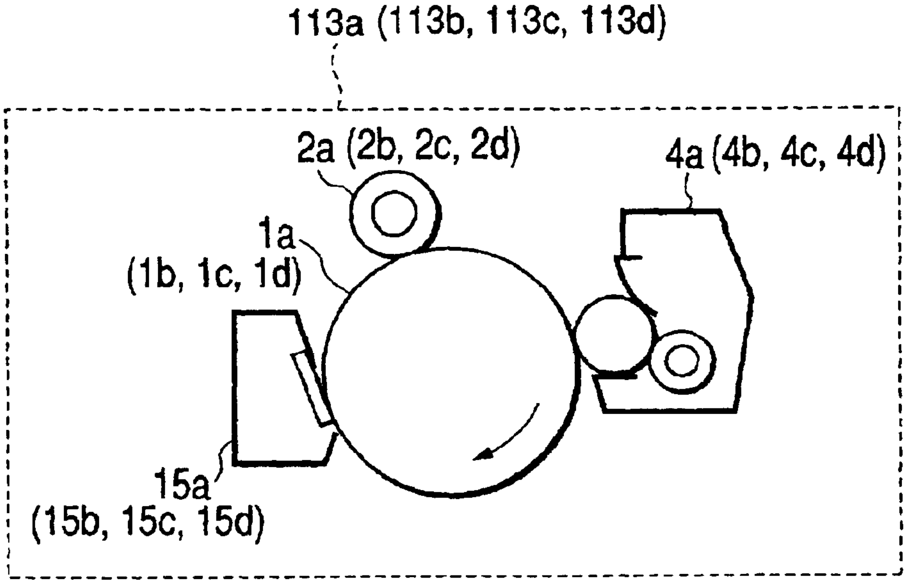
FIG. 10 is a view which shows the process cartridge used for the image forming apparatus represented in FIG. 9.
Figure 11:
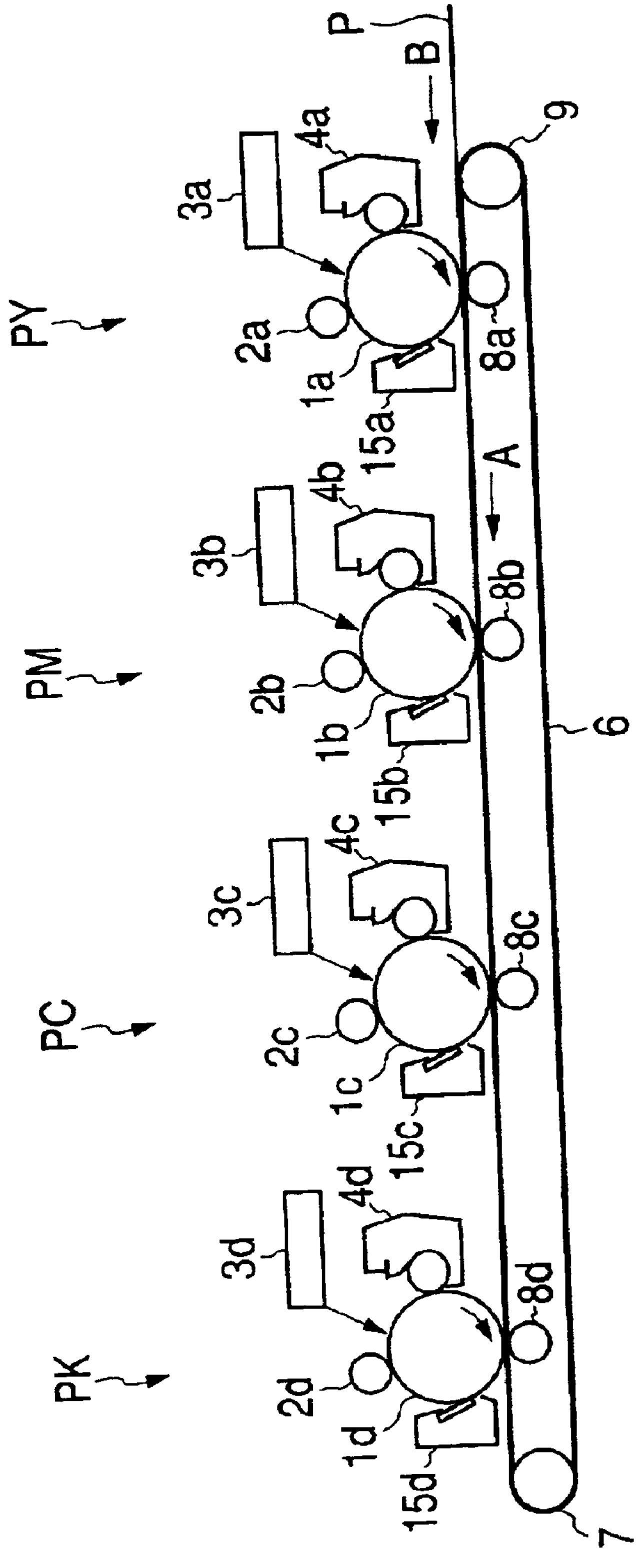
FIG. 11 is a view which shows the other example of conventional image forming apparatus.

As described above, in accordance with the present embodiment, the belt cleaner 11 of transfer belt 6 and the waste toner box provided for the cleaner, which are installed on the conventional image forming apparatus shown in FIG. 9, can be removed, hence making it possible to make the apparatus smaller at lower costs, as well as to enhance the user maintenance. Also, it is possible to solve the problems that may be encountered when the transfer belt cleaner 11 is removed.

In the above description, the photosensitive drams 1*a* to 1*d*, the chargers 2*a* to 2*d*, the developing devices 4*a* to 4*d*, and the cleaners 5*a*' and 5*b* to 5*d*, which constitute image forming means of each color, respectively, are integrated as the process cartridges 13*a* to 13*d*. However, it may be possible to adopt a mode in which the photosensitive drum and cleaner are integrated as a process cartridge.

(Second Embodiment)

Figure 4:
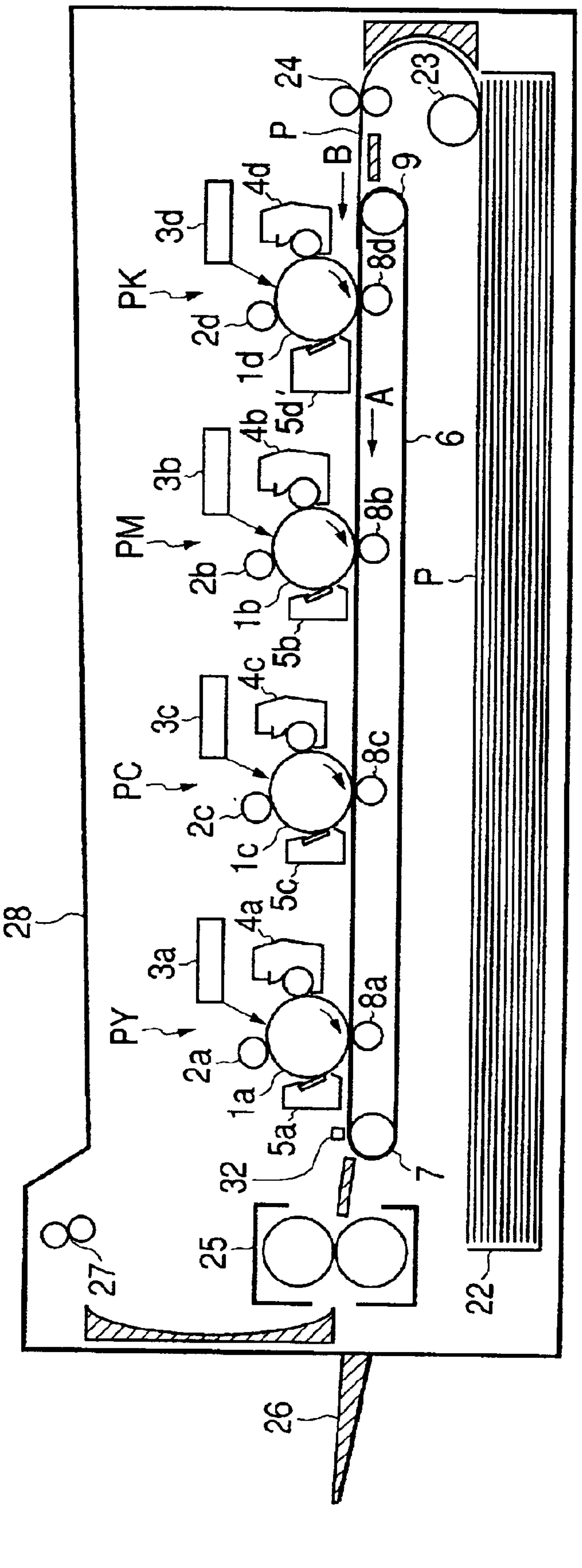
FIG. 4 is a view which shows an image forming apparatus in accordance with another embodiment of the present invention.

FIG. 4 is a view which shows the structure of an image forming apparatus in accordance with another embodiment of the present invention.

The image forming apparatus of the present embodiment is different from the image forming apparatus shown in FIG. 1 in that the positions of yellow and black image forming stations PY and PK are changed, and that the black station PK which is the first image forming means becomes the first station, and the yellow station PY becomes the fourth station.

Consequently, as described in conjunction with the first embodiment, the ratio of toner collected to the cleaner 5*d*' of first black station PK is greater when the toner that adheres mainly to the transfer belt 6 per density control is transferred to the photo-sensitive drums and cleaned by the drum cleaners. Therefore, in accordance with the present embodiment, the capacity of black cleaner 5*d*' to contain waste toner is set at a large value approximately 1.5 times those of other color cleaners 5*a* to 5*c*.

The method of applying cleaning bias to the transfer rollers 8*a* to 8*d* is the same as the first embodiment where the positive and negative biases are applied alternately. Therefore, for the present embodiment, the bias of negative polarity is applied to the transfer rollers 8*d* and 8*c* of the first and third image forming stations PK and PC, and the bias of positive polarity is applied to the transfer rollers 8*b* and 8*a* of the second and fourth image forming stations PM and PY. In this way, the toner that adheres to the transfer belt 6 is electrostatically returned to the photosensitive drum 1*a* to 1*d* side.

Also, when the transfer belt 6 is cleaned, the peripheral speed of the transfer belt 6 is made faster by approximately 1.7 times that of photosensitive drum to enhance the frictional force between transfer nips when the transfer belt rotates. In this way, the cleaning capability of the first station PK is enhanced. As a result, it becomes possible to collect approximately 80% of the total amount of toner from the transfer belt 6 to the black cleaner 5*d*', while suppressing the amount of toner to be collected to the other color cleaners 5*a* to 5*c*.

Figure 5:
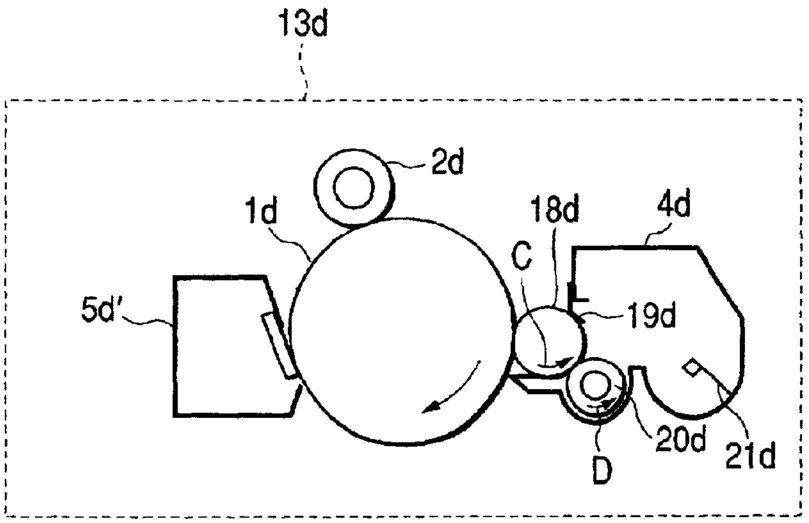
FIG. 5 is a view which shows the first station process cartridge of the image forming apparatus represented in FIG. 4.
Figure 6:
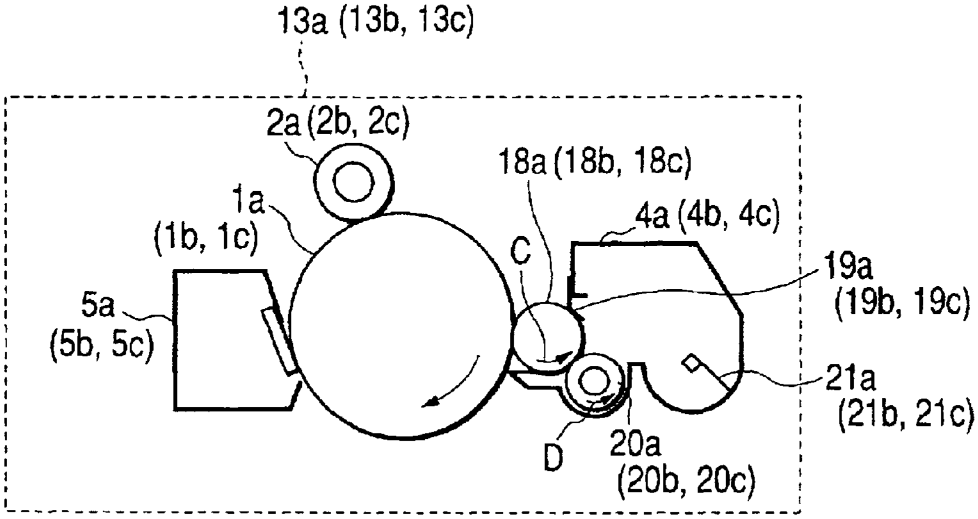
FIG. 6 is a view which shows the second to fourth station process cartridge of the image forming apparatus represented in FIG. 1.

For the present embodiment, too, among image forming means of the first station PK, the photosensitive drum 1*d*, the charge 2*d*, the developing device 4*d*, and the cleaner 5*d*' are structured to be the process cartridge 13*d*, as shown in FIG. 5, which is detachably attachable to the main body of image forming apparatus. Likewise, as shown in FIG. 6, the photosensitive drums 1*b*, 1*c*, and 1*a*, the chargers 2*b*, 2*c*, and 2*a*, the developing devices 4*b*, 4*c*, 4*a*, and the cleaners 5*b*, 5*c*, and 5*a*, among image forming means of the second, third, and fourth stations PM, PC, and PY, are structured to be the process cartridges 13*b*, 13*c*, and 13*a*, respectively, which are detachably attachable to the main body of image forming apparatus.

With the market researches described earlier, it has been confirmed that when a user uses a color printer actually, the amount of black toner consumption is greater in terms of the total amount of toner consumption classified by colors. Then, as shown in FIG. 4, if the toner capacity of each color of the developing devices 4*a* to 4*d* is the same, the replacement frequency of the black cartridge 13*d* becomes higher.

In accordance with the present embodiment, the capacity of cleaner 5*d*' to contain waste toner for the black cartridge 13*d*, the replacement frequency of which is higher, is made greater so as to avoid the puncture condition more effectively that may be brought about by the overflow of waste toner if the cartridge 13*d* is not replaced for a long time than the case where the capacities of cleaners 13*a* to 13*c* of the other colors are made greater to contain waster toner.

As a result, it is possible to prevent the process cartridges from becoming unusable as far as the circumstances permit, irrespective of the problems related to the puncture caused by waste toner or despite toner still remains sufficiently in the developing devices, hence implementing to enhance the user's maintainability.

For the present embodiment, the capacities of developing devices 4*a* to 4*d* to contain toner are made the same, but it may be possible to increase the capacity of the black development device 4*d* which is used more often, and then, to make the capacity of the black cleaner 5*d*' larger still to the extent of the toner amount thus increased.

(Third Embodiment)

Figure 7:
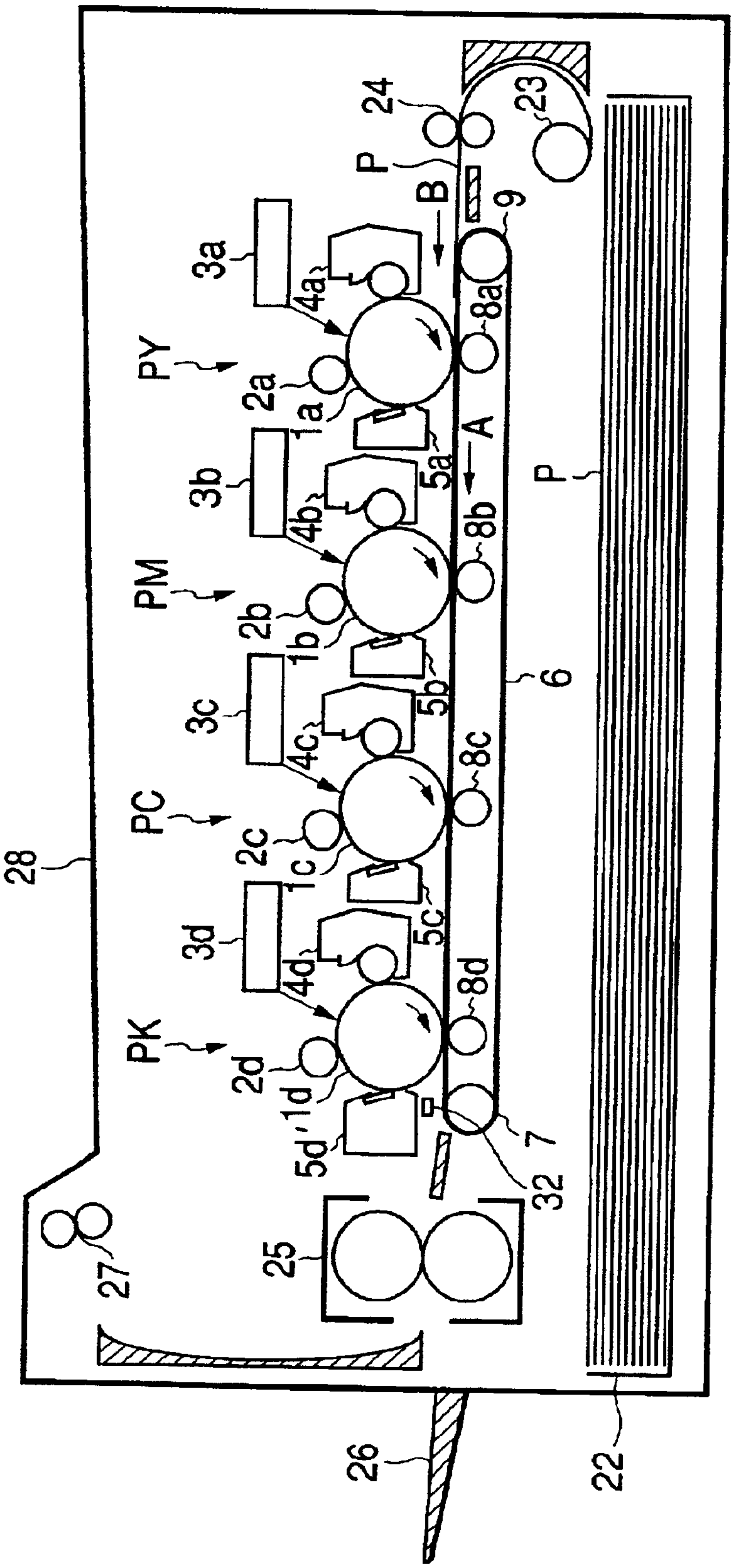
FIG. 7 is a view which shows an image forming apparatus in accordance with still another embodiment of the present invention.

FIG. 7 is a view which shows the structure of an image forming apparatus in accordance with still another embodiment of the present invention.

The image forming apparatus of the present embodiment is different from the image forming apparatus shown in FIG. 1 in that the capacity of cleaner 5*d*' to contain waste toner is made larger for the fourth black image forming station PK, which serves as first image forming means, not that of the cleaner 5*a* of the first yellow image forming station PY.

The photosensitive drams 1*a*, 1*b*, and 1*c*, the charger 2*a*, 2*b*, and 2*c*, the developing devices 4*a*, 4*b*, and 4*c*, and the cleaners 5*a*, 5*b*, and 5*c* of the first, second and third image forming stations PM, PC, and PY are structured to be the process cartridges 13*a*, 13*b*, and 13*c* as shown in FIG. 6 previously, which are detachably attachable to the main body of image forming apparatus, respectively. The photosensitive drum 1*d*, the charger 2*d*, the developing device 4*d*, and the cleaner 5*d*' of the fourth station PK are structured to be the process cartridge 13*d* as shown in FIG. 5 previously, which is also detachably attachable to the main body of image forming apparatus.

For the present embodiment, too, the capacity of black cleaner 5*d*' is set at a large value approximately 1.6 times those of the other color cleaners 5*a* to 5*c*. The black station PK is arranged on the most downstream side of the carrying passage of transfer belt 6. As a result, even if the capacity of cleaner 5*d*' is made larger, it becomes possible to keep the interval between the stations PK and PC equal to the interval between other stations PC and PM, and PM and PY, that is, to keep the interval between the photosensitive drums 1*d* and 1*c* equal to the interval between the photosensitive drums 1*c* and 1*b*, and 1*b* and 1*a*. As a result, it becomes unnecessary to control often to correct color registrations or the like. Then, there is no possibility that color deviation accuracy is not deteriorated even if the apparatus is made smaller.

Now, the description will be made of the cleaning method of transfer belt in accordance with the present embodiment. In the cases of the first and second embodiments, the collection ratio of toner to the first station is made greater, but in the present embodiment, the collection ratio of toner to the cleaner 5*d*' of fourth black station PK is made greater as given below.

At first, control is made so as not to apply cleaning bias to the transfer rollers 8*a* to 8*c* of the first to third stations PY to PC during the patch formed on the transfer belt 6 passes them. Then, when the leading end of the patch reaches the nipping portion between the photosensitive drum 1*d* of fourth station PK and the transfer roller 8*d*, bias of negative polarity is applied to the transfer roller 8*d* at first. In this way, much of toner on the transfer belt 6 is transferred to the photosensitive drum 1*d* and collected to the cleaner 5*d'*.

Then, when the patch makes a round and reaches the first to third yellow, magenta, and cyan image forming stations PY, PM, and PC, biases of positive polarity, negative polarity, and negative polarity are applied to the transfer rollers 8*a*, 8*b*, and 8*c*, respectively, to clean off the remaining toner on the transfer belt 6.

When the transfer belt 6 is cleaned, it is arranged to make the peripheral speed of transfer belt faster approximately 1.5 times that of the transfer belt at the time of forming image so as to intensify the friction force between the transfer nips and enhance the cleaning capability of the cleaners.

With the arrangement described above, it becomes possible to collect approximately 70% of the total amount of toner from the transfer belt 6 to the black cleaner 5*d'*.

For the present embodiment, the capacity of cleaner 5*d'* of black cartridge 13*d* is made larger still than that in the second embodiment, hence making it possible to avoid more reliably the condition of waste toner puncture due to the fact that the cartridge 13*d* is not replaced for a long time.

Further, with the black cartridge 13*d* arranged on the most downstream in the recording material carrying direction of the transfer belt 6, the interval between the black image forming station PY and the station PC on the upstream side thereof is not affected even if the capacity of cleaner 5*d'* is made greater for the photosensitive drum 1*d* which is arranged on the downstream side. Also, the interval can be kept to be equal to those between other stations, hence enabling the image forming apparatus to be made smaller without deteriorating the color deviation accuracy.

Figure 8:
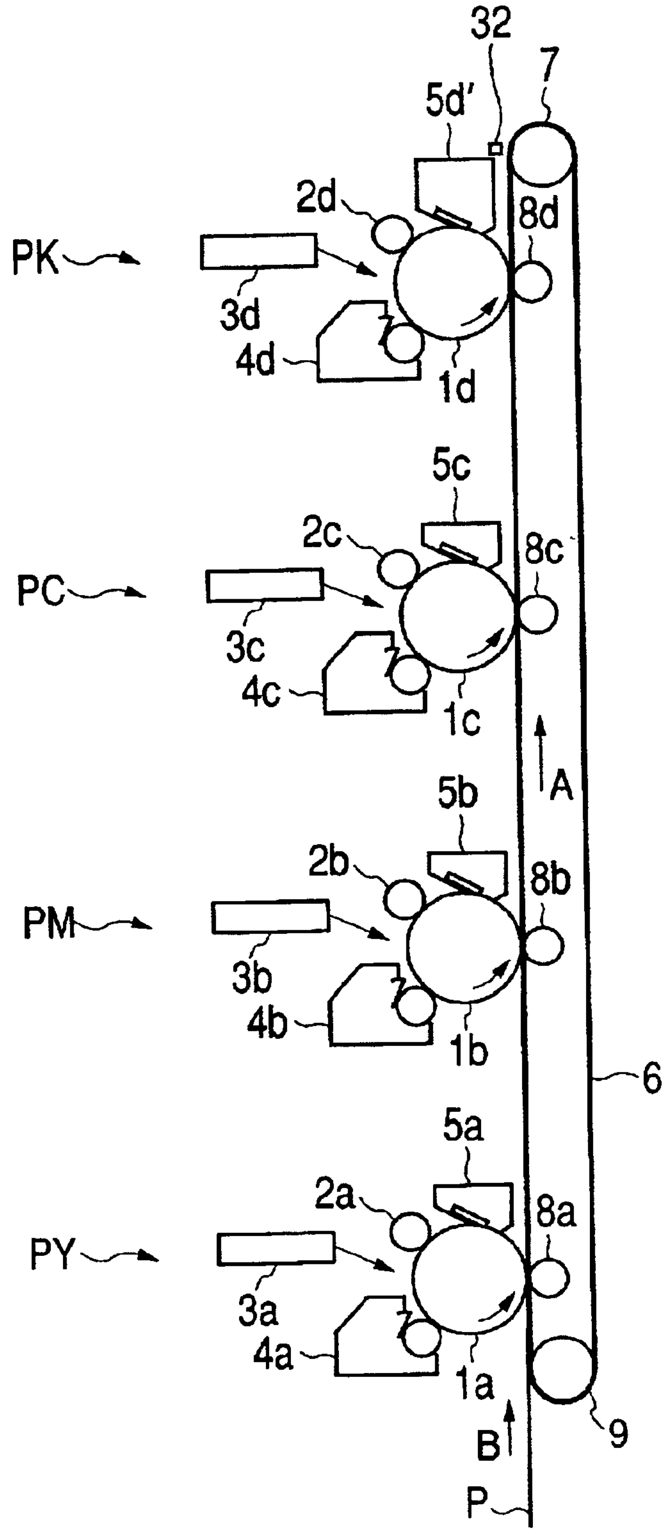
FIG. 8 is a view which shows the other image forming apparatus to which the present invention is applicable.

In accordance with the first to third embodiments described above, the transfer belt 6 is arranged in the direction side by side, and image is formed by the image forming stations arranged along the transfer belt on a recording material to be carried by the transfer belt in the horizontal direction. However, as shown in FIG. 8, it is possible to apply this invention to an in-line color printer in which the transfer belt 6 arranged in the vertical direction to form image by the image forming stations PY to PK which are arranged along the transfer belt on a recording material to be carried by the transfer belt in the vertical direction. In FIG. 8, the same reference marks are applied to the same members as those appearing in FIG. 7.

For example, the capacity of the cleaner 5*d'* to contain waste toner for the fourth black image forming station PK, which serves as first image forming means, on the uppermost stage on the most downstream of the recording material carrying direction of the transfer belt 6 is made greater than each capacity of cleaners 5*a* to 5*c* to contain waste toner for the other image forming stations PY to PC. Then, with the application of the same cleaning biases as the third embodiment to the transfer rollers 8*a* to 8*d*, it becomes possible to execute the collection of toner from the transfer belt 6 at a larger collection ratio for the black cleaner 5*d'*.

Figure 12:
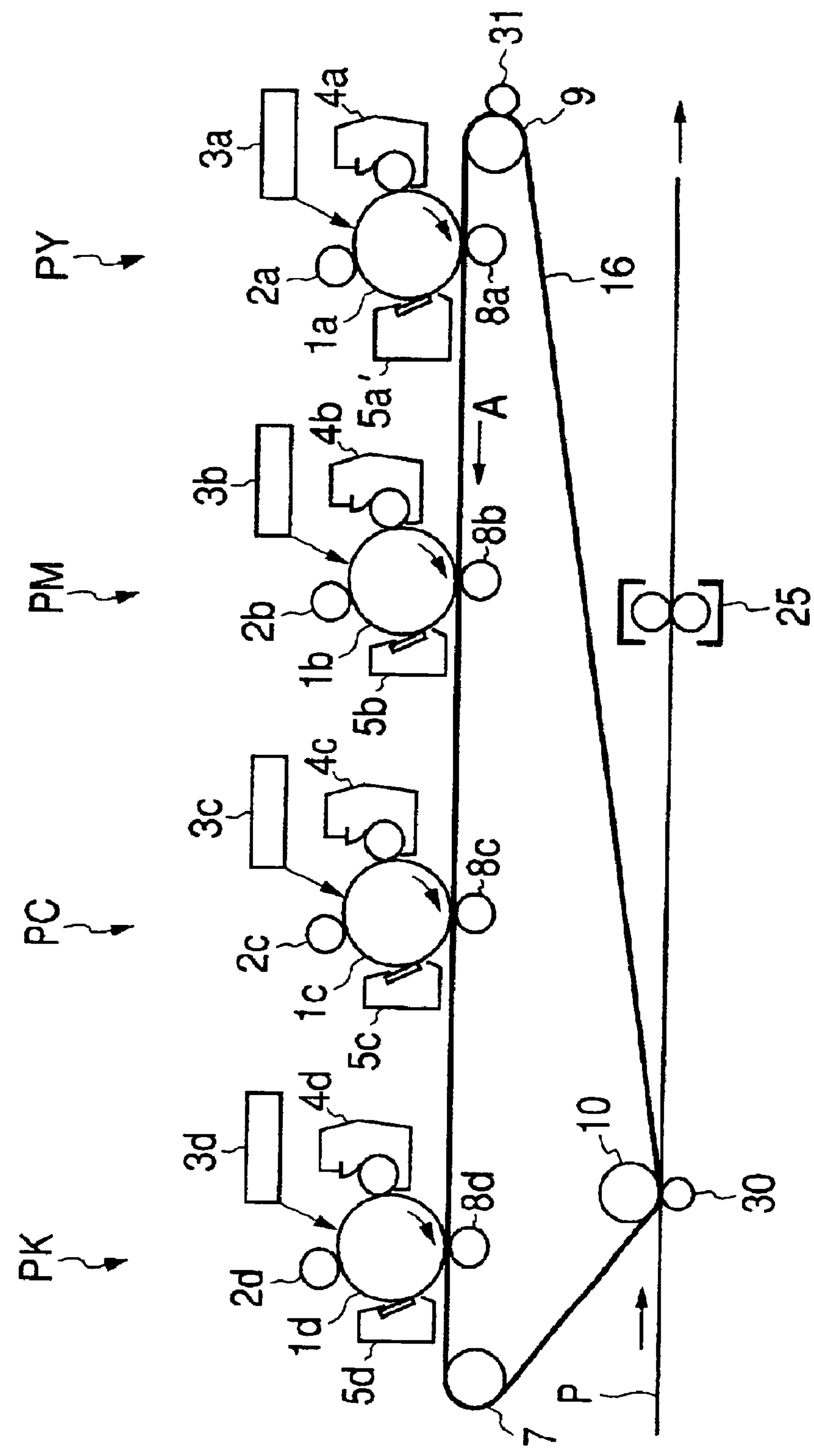
FIG. 12 is a view which shows the other image forming apparatus to which the present invention is applicable.

Also, for any one of the first to third embodiments, the description has been made of the image forming apparatus in which the toner image of plural colors formed on the plural photosensitive drums is directly transferred and superposed on a recording material carried by the transfer belt 6, and fixed thereon, but the present invention is also applicable to an image forming apparatus of intermediate transfer type as shown in FIG. 12 in which plural image forming stations are arranged along an intermediate transfer body 16, such as an intermediate transfer belt, and the toner image of plural colors formed on the plural photosensitive drams thereof is once transferred and superposed on the intermediate transfer body which is a carrying member, and then, in succession, the toner image of plural colors thus transferred to the intermediate transfer body is transferred by a transfer member 30 altogether to a recording sheet carried to the intermediate transfer body, thus being fixed thereon. The cleaning of such intermediate transfer body is not made by any cleaning means, but effectuated in such a manner that positive charge is given to the remaining toner on the intermediate transfer body by electrical charging means 31, and after that, the remaining toner is transferred to the photosensitive drum by the transfer roller 8*a* to which positively biased voltage is applied, and then, collected by use of the cleaner 5*a'*. With the application of the present invention to this apparatus, it is possible to obtain the same effects as the embodiments described above. Here, in this case, the negatively charged toner image developed by the developing device 4*a* can be transferred to the intermediate transfer body on the transfer position.

As described above, in accordance with the present invention, cleaning means of a recording material carrying member or the like can be eliminated for an in-line type image forming apparatus, and the toner that adheres to the carrying member or the like is returned to a photosensitive body electrostatically by use of potential difference and collected by cleaning means of the photosensitive body. At this juncture, at least one of cleaning means of image forming means is arranged to provide a larger capacity to contain waste toner than that of cleaning means of the other image forming means. Then, at least the amount of toner collected by such particular one of cleaning means is made greater so as to reduce the occurrence of waste toner puncture at cleaning means, hence enhancing the maintainability of the apparatus, and at the same time, implement making the apparatus smaller.

Also, the elements that include photosensitive body of image forming means are structured to be a process cartridge which is detachably attachable to the main body of image forming apparatus, and when cleaning means of the black cartridge which has a higher frequency of replacements among the cartridges thus structured, it becomes possible to prevent them, as far as the circumstances permit, from being made unusable despite toner still remains sufficiently in the developing device of cartridge. Further, with the arrangement of the black cartridge on the most downstream of recording material carrying member, it becomes possible to implement making the apparatus smaller without deteriorating color deviations if the cleaning means of such cartridge is defined as specific cleaning means.

In this respect, although the present invention has been described with reference to the specific embodiments, it is not meant to be construed in a limiting sense. Various modifications of the disclosed embodiments, as well as other embodiments of the invention, will be possible within the technical thought of the invention.

What is claimed is:

1. An image forming apparatus comprising:

a carrying member for bearing and carrying toner image; and a plurality of image forming means arranged along said carrying member;

wherein each of said plurality of image forming means includes an image bearing body, developing means for developing latent image on said image bearing body by toner, and cleaning means for effecting cleaning of toner on said image bearing body, wherein the toner image on said image bearing body is transferred to said carrying member side, wherein toner on said carrying member is collected by said cleaning means via said image bearing body, and wherein a volume of cleaning means of first image forming means of said plurality of image forming means to contain toner is larger than a volume of cleaning means of other image forming means to contain toner.

2. An image forming apparatus according to claim 1, wherein said first image forming means is arranged on the most upstream side in a carrying direction of said carrying member among said plurality of image forming means.

3. An image forming apparatus according to claim 1, wherein toner of said developing means of said first image forming means is in black color.

4. An image forming apparatus according to claim 1, wherein said first image forming means is arranged on the most downstream side in a carrying direction of said carrying member among said plurality of image forming means.

5. An image forming apparatus according to claim 4, wherein said cleaning means of said first image forming means is arranged on a downstream side of said image bearing body of said first image forming means in the carrying direction of said carrying member.

6. An image forming apparatus according to claim 1, wherein the cleaning of the toner on said carrying member is effected from said first image forming means among said plurality of image forming means.

7. An image forming apparatus according to claim 6, wherein the toner on said carrying member is an image used for detecting a density of toner image or for detecting a position.

8. An image forming apparatus according to claim 1, wherein said carrying member bears the toner image via a recording material and carries the recording material having the toner image borne thereon.

9. An image forming apparatus according to claim 1, wherein said carrying member bears the toner image directly, and the toner image is transferred to a recording material after being carried.

10. An image forming apparatus according to claim 1, wherein said developing means of said plurality of image forming means are provided with toner of different colors, respectively.

11. An image forming apparatus according to claim 1, further comprising a cartridge containing at least said image bearing body and said cleaning means, wherein said cartridge is detachably attachable to a main body of said apparatus.

* * * * *

UNITED STATES PATENT AND TRADEMARK OFFICE

CERTIFICATE OF CORRECTION

PATENT NO. : 6,885,473 B2
DATED : April 26, 2005
INVENTOR(S) : Satoshi Tsuruya

It is certified that error appears in the above-identified patent and that said Letters Patent is hereby corrected as shown below:

<u>Column 2,</u>
Line 3, “from” should read -- form --; and
Line 7, “an” should read -- a --.

<u>Column 4,</u>
Line 54, “dram” should read -- drum --.

<u>Column 9,</u>
Line 4, “prepared” should read -- prepare --.

<u>Column 12,</u>
Line 67, “passes” should read -- passing --.

<u>Column 14,</u>
Line 51, “as” should read -- as a --.

Signed and Sealed this

Thirtieth Day of August, 2005

JON W. DUDAS
*Director of the United States Patent and Trademark Office*